United States Patent [19]
Reuter et al.

[11] Patent Number: 5,761,156
[45] Date of Patent: Jun. 2, 1998

[54] PIEZOELECTRIC ULTRASONIC TRANSDUCER

[75] Inventors: Martin Reuter, Dachau; Konrad Voigt, Bad Klosterlausnitz; Valeri Weksler, Hermsdorf, all of Germany

[73] Assignee: marco Systemanalyse und, Dachau, Germany

[21] Appl. No.: 737,694

[22] PCT Filed: Apr. 2, 1996

[86] PCT No.: PCT/EP96/01445

§ 371 Date: Nov. 19, 1996

§ 102(e) Date: Nov. 19, 1996

[87] PCT Pub. No.: WO96/31870

PCT Pub. Date: Oct. 10, 1996

[30] Foreign Application Priority Data

Apr. 3, 1995 [DE] Germany ............ 195 12 417.0

[51] Int. Cl.$^6$ .................................................. H04R 17/00
[52] U.S. Cl. .................... 367/140; 367/152; 367/158; 310/322; 310/336; 73/632; 73/644
[58] Field of Search ............................ 367/140, 152, 367/158, 159, 162, 163, 174; 310/322, 323, 333, 336; 73/632, 644

[56] References Cited

U.S. PATENT DOCUMENTS

| | | | |
|---|---|---|---|
| 3,370,186 | 2/1968 | Antonevich | 367/140 |
| 3,750,279 | 8/1973 | Cobarg et al. | 30/43.9 |
| 4,072,871 | 2/1978 | Wilson | 310/333 |
| 4,219,889 | 8/1980 | Parssinen et al. | 367/158 |
| 4,231,112 | 10/1980 | Massa | 367/158 |
| 4,471,475 | 9/1984 | Brunson | 367/161 |
| 4,536,862 | 8/1985 | Sullivan et al. | 367/153 |
| 4,633,119 | 12/1986 | Thompson | 310/325 |
| 4,718,046 | 1/1988 | Medlin | 367/31 |
| 4,735,096 | 4/1988 | Dorr | 73/662 |
| 4,752,918 | 6/1988 | Boucher et al. | 367/158 |
| 4,878,207 | 10/1989 | Jandera et al. | 367/155 |
| 5,130,953 | 7/1992 | Grosso | 367/155 |
| 5,254,900 | 10/1993 | Magori et al. | 310/334 |
| 5,625,149 | 4/1997 | Gururaja et al. | 73/632 |

FOREIGN PATENT DOCUMENTS

| | | |
|---|---|---|
| 3920663A1 | 1/1991 | Germany . |
| 6-126397 | 2/1986 | Japan . |

Primary Examiner—J. Woodrow Eldred
Attorney, Agent, or Firm—Jordan and Hamburg

[57] ABSTRACT

The invention relates to a piezoelectric transducer particularly for use in transit time measurements. The object of the invention is to provide a piezoelectric transducer which ensures an in-phase two-dimensional pulse emission which, independent of the selection of a definite excitation frequency, substantially closely follows the electric excitation at a low time deformation of the pulse owing to transient and dying-out operations and which permits to obtain sufficiently high sound levels at low amplitudes of the excitation voltage. These objects are realized according to the invention in that the center of mass of the entire transducer system is remote from a sound emitting and sound receiving, respectively, surface (4) and in that at least one piezoelectric sheet (1) is provided which via one of its narrow sides (21) is connected to at least one rigid, geometrically and variably adaptable cover plate (3) of low mass, compared to the entire transducer and sheet mass, respectively, in such a manner that the entire surface (4) of the cover plate (3), at least in the sound emitting mode, is substantially and completely covered by the surface lines (5) of an emission angle ($\alpha$) under which the piezoelectric sheet irradiates said cover plate (3), and only to said surface (4) the function of being a sound emitting and/or a sound receiving area is assigned.

14 Claims, 6 Drawing Sheets

5,761,156

1

PIEZOELECTRIC ULTRASONIC TRANSDUCER

BACKGROUND OF THE INVENTION

The invention relates to a piezoelectric ultrasonic transducer according to the kind of art of the first claim, particularly for use in transit time measurements.

Oscillators made of piezoelectric material are conventionally employed to generate ultrasonic sound in which the coupling of the oscillator to the medium into which the ultrasonic sound has to be emitted is of great importance. The coupling is the better the lower is the sound characteristic impedance between the oscillator and said medium. When the ultrasonic sound has to be emitted into air the coupling typically is particularly poor, since the sound characteristic impedances of air and piezoceramics differ by several orders of size. Irrespective of the fundamental problem of said poor matching the sound power emitted is the higher the greater is the sound amplitude Therefore, such transducers are typically operated in resonance when high sound powers have to be obtained. When, for example, in transit time measurements, short sound pulses have to be emitted then either the transducer resonance has to be strongly attenuated or the transducer has to be operated below its lowest resonant frequency. With single-layer thickness oscillators the attainable sound amplitude of the area emitting the sound lies within narrow limits since the excitation voltages required can be very high.

A solution which is nearest to the present invention is described in DE 39 20 663 Al. In said solution the so-called piezoelectric transverse effect ($d_{31}$-effect) is exploited. This paper proposes to manufacture an electroacoustic sound transducer composed of one or a plurality of piezoceramic sheets in which the space between the sheets is filled with a material of lower sound characteristic impedance, such as hollow spheres made of glass or $SiO_2$ embedded in resin, or the like. The entire transducer element is constituted of a massive sandwich-like body of stacked layers in which the emitting and/or receiving face is a leading face of the body of stacked layers. With such a transducer in-phase surface oscillations with only one predetermined directional characteristic are obtainable. Said transducer is disadvantageous because, on the one hand, it delivers a sufficiently high efficiency only in resonance. On the other hand, the coupled mechanical properties of this layer compound require as concerns frequency, output, and directional characteristic to set up a completely new concept for the entire transducer construction including all its components. Furthermore, a transducer according to DE 39 20 663 Al requires considerable additional attenuation means when it is used for transit time measurements.

SUMMARY OF THE INVENTION

It is an object of the invention to provide a piezoelectric ultrasonic transducer which ensures, independent of a definite selected excitation frequency, an in-phase and two-dimensional pulse emission of low time deformation of the pulse due to initial transient and dying-out transient which follows the electric excitation as closely as possible, and which realizes sufficiently high sound levels at low amplitudes of the excitation voltage. It is a further object of the invention to provide a piezoelectric ultrasonic transducer which, without any additional attenuation means, rapidly returns to the reception state after transmission.

BRIEF DESCRIPTIONS OF THE INVENTION

These objects are realized by the features of the first claim. It is an essential of the invention that it provides a new

2 and substantially decoupled arrangement of at least one sheet made of piezoceramic material operating in $d_{31}$-mode and the operational direction of which, or at least one essential component thereof, is connected via a narrow leading face to a geometrically matched low mass, however, rigid cover plate and cover lamina, respectively, the normal $n_2$ of which coincides with the abovementioned operation direction and its components, respectively, wherein only the low mass cover plate has the function of a sound-emitting and/or receiving face. In a further embodiment of the invention said cover plate is particularly conceived as a system capable of self-sustained oscillations. The piezoceramic sheets employed according to the invention are provided with an electrically conductive contact means on both sides of their large lateral faces.

Further advantageous embodiments of the invention are disclosed in the dependent claims.

DETAILED DESCRIPTION OF THE INVENTION

Figure 1:
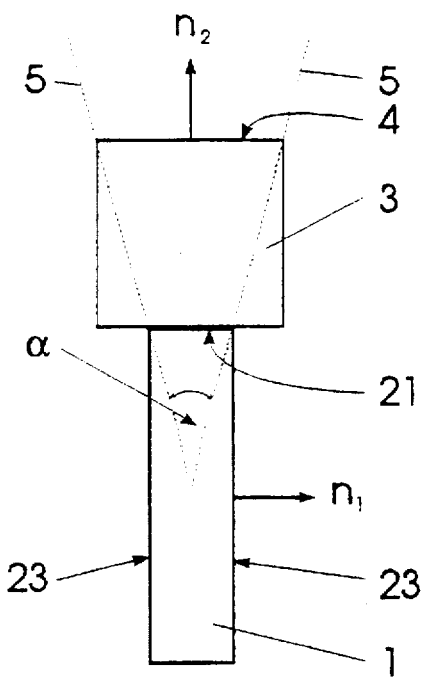

The invention will be explained in more detail by virtue of five embodiments illustrated by the respective schematical drawings. There is shown in:

FIG. 1 a schematical view of a basic embodiment according to the invention.

Figure 1B:
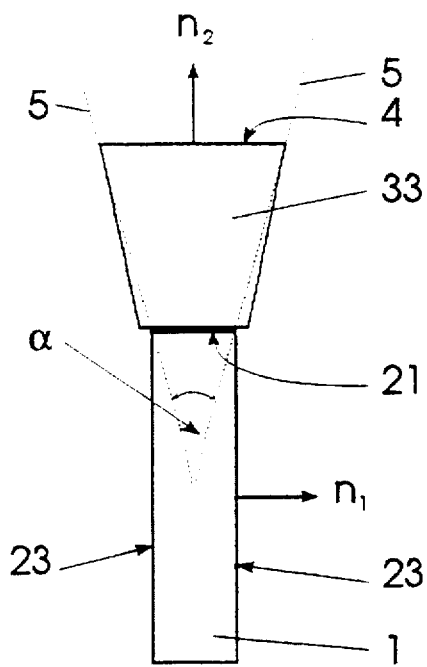
Figure 1A:
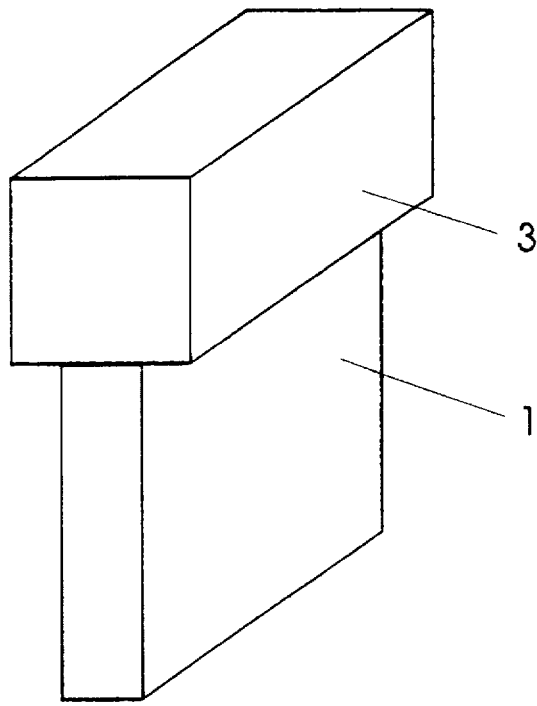

FIG. 1a a perspective view of an embodiment according to FIG. 1.

FIG. 1b a schematical view of a further embodiment according to FIG. 1.

Figure 2:
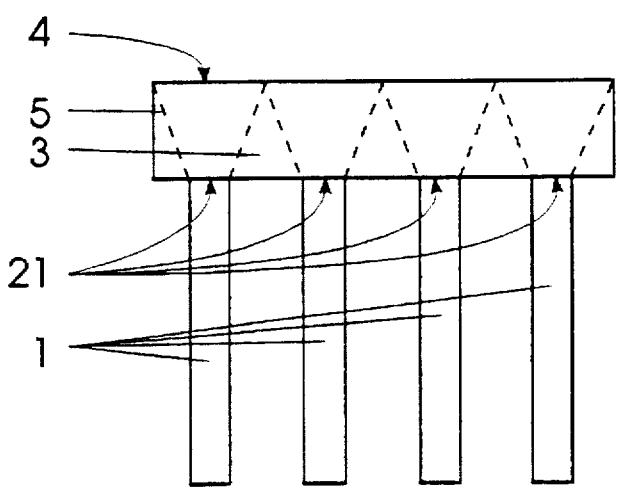

FIG. 2 a schematical view of a second basic embodiment according to the invention.

Figure 2A:
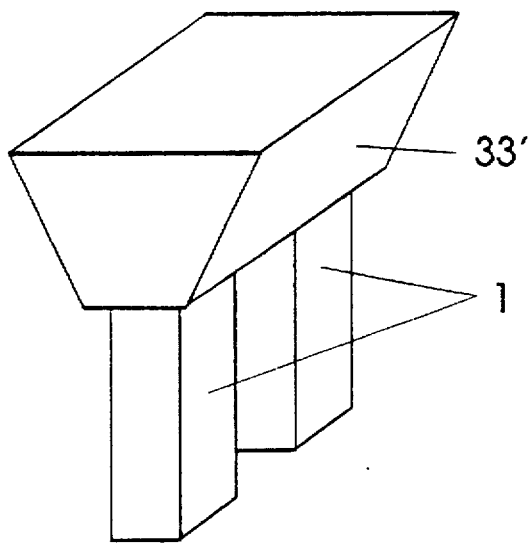

FIG. 2a a perspective view of an embodiment according to FIG. 2.

Figure 2B:
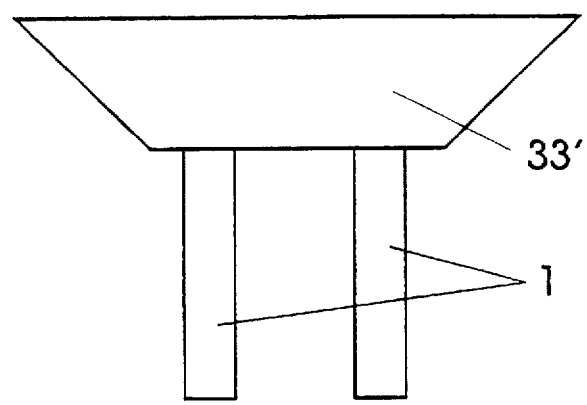

FIG. 2b a further embodiment according to FIG. 2.

Figure 3:
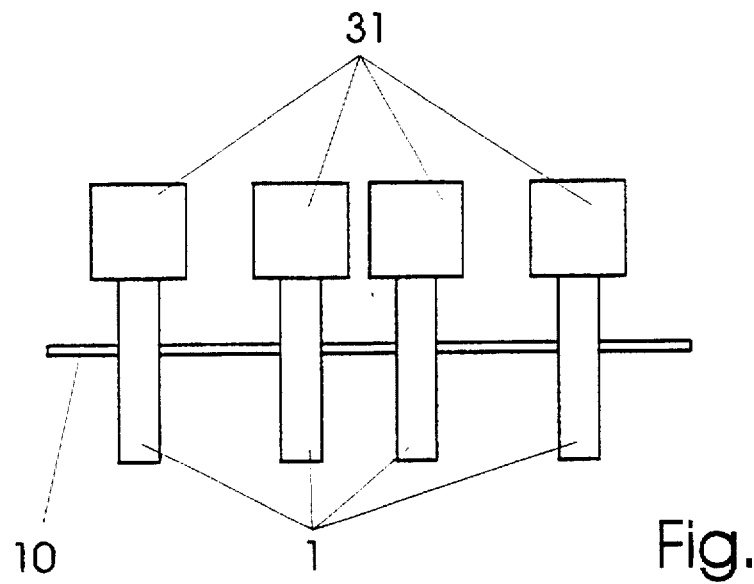

FIG. 3 a schematical view of a third embodiment according to the invention.

Figure 3A:
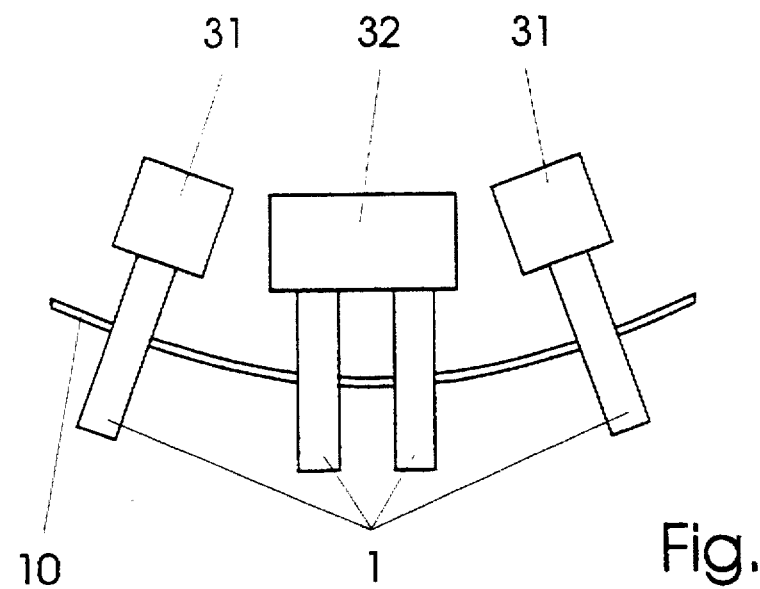

FIG. 3a a schematical view of a modification according to FIG. 3.

Figure 4:
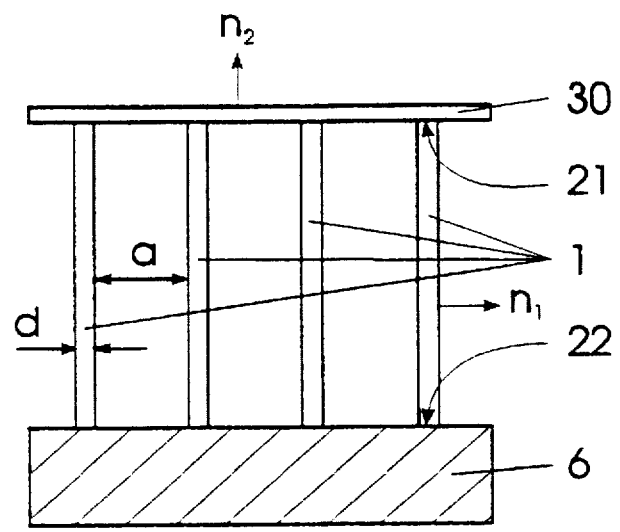

FIG. 4 a schematical view of a fourth basic embodiment according to the invention.

Figure 5:
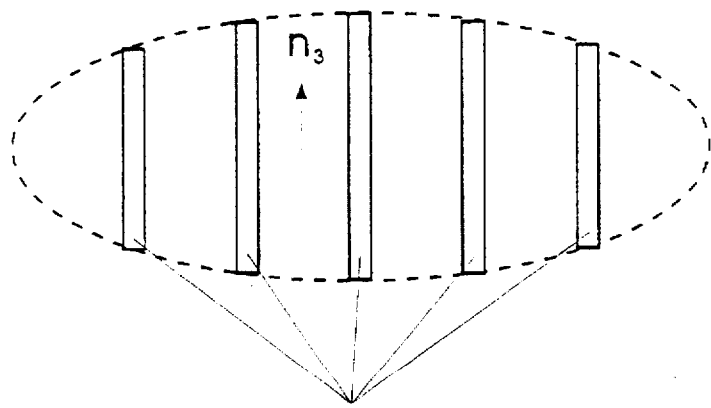

FIG. 5 a plan view of an embodiment and arrangement of the sheet according to FIG. 4.

Figure 6:
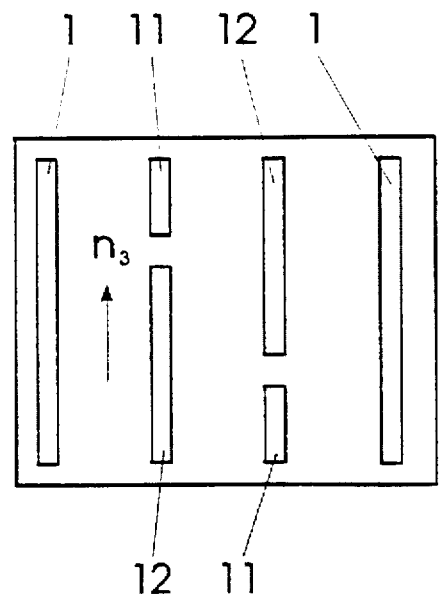

FIG. 6 a plan view of a further embodiment and arrangement of the sheet according to FIG. 4.

Figure 7:
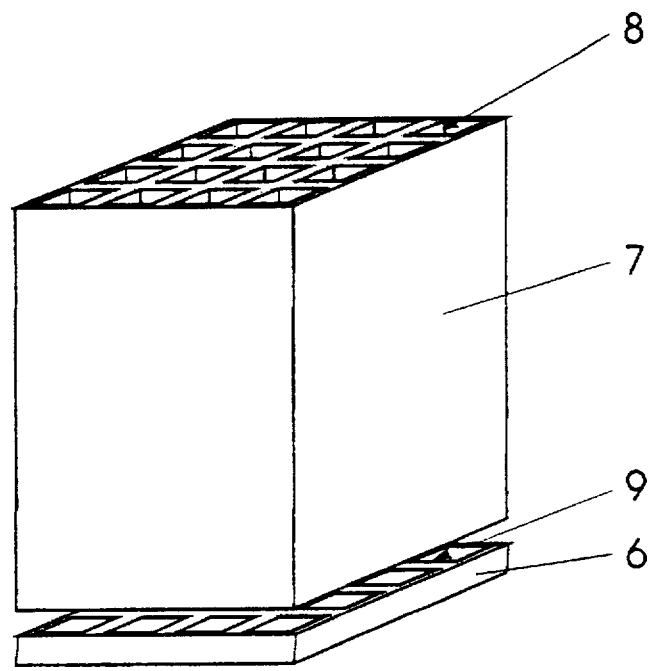

FIG. 7 a fifth basic embodiment according to the invention in perspective view of a honeycomb structure of the sheet with a cover plate removed.

Figure 8:
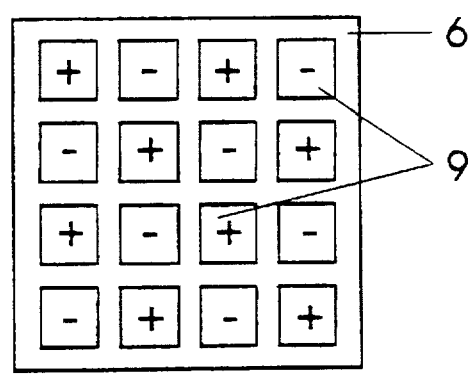
Figure 9:
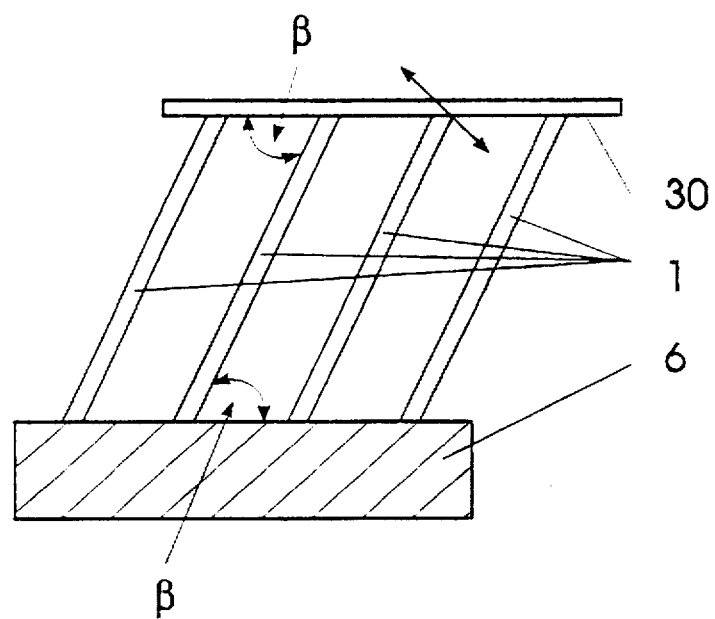

FIG. 8 a schematic plan view of a base plate embodiment for a sheet structure according to FIG. 7, and FIG. 9 a lateral view of a further embodiment according to FIG. 4.

In FIG. 1, a first embodiment of a piezoelectric ultrasonic transducer is represented constituted of a plate-shaped sheet 1 which on both of its lateral broad faces 23 is provided with conventional electric contacting means (not shown in detail). Said sheet 1 is connected via one of its narrow sides 21 to a rigid cover plate 3. Said cover plate 3 is of low mass, compared to the mass of the piezoceramic oscillating system comprising the sheet 1, said electric contacting means and, if required, a further counter plate and sound reflecting means, respectively, not shown in detail. Versions of a low mass execution will be referred to hereinafter in more detail. The normals also introduced in the other embodiments for the sake of more distinctness of the description are designated with $n_1$ for said sheet 1 and $n_2$ for said cover plate 3 and a respective arrow. According to the invention the geometry of the cover plate 3 is embodied in such a manner that the progress of the surface lines 5 is such that the sound substantially covers entirely and evenly a surface 4 of the cover plate 3; said surface lines 5 enclosing a sound emission angle α which includes the solid-borne sound generated by the piezoceramic sheet 1, when exited, and entering the cover plate 3 via the face 21. Preferably the cover plate 3 is embodied to form a self-sustained oscillation system. This, for example, can be achieved by designing the cover plate of hollow spheres made of glass or silicon oxide enclosed in epoxy resin. In this case the cover plate 3, for example, is a cube-shaped body having dimensions of (4·5·5) mm.

Such a quadrangle can, for example, have an inherent frequency of 85 kHz. The inherent resonant frequency of the piezoceramic sheet 1, correlated to the active direction, can, for example, be 110 kHz. Such a transducer preferably is operated with a self-resonance of the cover plate of, for example, 85 kHz, that is, the piezo-sheet is operated outside of its self-resonance. Due to the inventional arrangement and coupling it also is feasible to produce large motion amplitudes of the piezo-sheet outside of its self-resonance and to transmit them to the cover plate which results in very large oscillation amplitudes of the surface emitting the ultrasound.

The ultrasonic energy emitted, related to the emitting face, can increase by about a factor five compared to the prior art.

The operation of the piezo-sheet outside of its resonance results in very short dying-out times of the transducer. Furthermore, the inventional arrangement permits additional attenuation means for said piezo-sheet without the disadvantage of a reduction of the ultrasonic amplitude.

FIG. 1a shows in a perspective view that, depending on the desired directional characteristic or amplitude, it is feasible to develop the entire system of FIG. 1 in any longitudinal extension with a longer sheet 1 and with a correspondingly dimensioned cover plate 3 at right angles to the directions of the normals $n_1$ and $n_2$.

FIG. 1b shows a further embodiment of the cover plate 3 in the shape of an inverted truncated pyramid 33 which is via its small cover surface connected to the narrow side 21 of the sheet 1. The inclined lateral faces of the truncated pyramid are substantially in parallel to said surfaces lines 5 including the angle α (which preferably is 90°) which ensures that the solid-borne sound evenly and homogeneously covers the surface 4. Furthermore, such a truncated pyramid shape of the cover plate 3 involves a reduction of the resonant frequency, an enlargement of the emitting and receiving, respectively, area and, thus, an enhancement of the transmitting/receiving sensitivity as well as an improvement of the directional characteristic.

FIG. 2 shows a further basic embodiment of the invention in which a plurality of equally spaced sheets 1 are connected to a one piece overall cover plate 3 via their respective narrow sides 21. The mutual space of the sheets 1 is, in accordance with the above measures, so dimensioned that the surface 4 of the cover plate 3 is evenly and homogeneously covered by the solid-bone sound of the piezo-sheets 1, as schematically indicated by the dash-lined surface lines 5. This arrangement can also be embodied in analogy to FIG. 1a. Furthermore, it is feasible, provided that the required rigidity of the cover plate 3 is not deteriorated, to insert and to attach, respectively, recesses and slopes, respectively, following the surface lines 5 in/to the bottom side of the cover plate.

FIGS. 2a and 2b show a further feasible embodiment of FIG. 2 in which the cover plate 33', similar to FIG. 1b, is embodied as a truncated pyramid roof-like extended in one dimension. In this example the cover plate 33' is excited by two piezoceramic sheets 1, excitable by an equal frequency and phase position.

In FIG. 3 a further basic embodiment according to the invention is shown in which a plurality of modular systems according to FIG. 1 is employed mounted on a common support 10 preferably arranged in the plane of the mass center of the system. Each of the sheets 1 employed is provided with an individual cover plate 31. Such an embodiment is particularly suited for a variable and mutually different control of the individual modules with respect to frequency, phase position, and/or amplitude, which permits to control the emission angle of the sound lobe as well as the direction of sound propagation within wide limits. By means of optionally selectable drive pulse patterns in time and space it is basically feasible to locate bodies in space and to determine their distance, size, and position as well as to track their motion. An embodiment according to FIG. 3a substantially is in analogy to FIG. 3, in which two modules are provided with a common cover plate 32. The common cover plate 32 either is made of one piece or manufactured by gluing two adjacent cover plates 31. The advantages obtained correspond to those described in FIG.3. Depending on the kind of application the modules described in FIGS. 3 and 3a can be arranged equally or differently spaced apart, as represented, or, as shown in FIG. 3a, on a curved line in order to obtain definite focusing effects. It lies within the scope of the invention to construct the embodiments according to FIGS. 3 and 3a in a two-dimensional array by a multifold series-connection of the modules represented. The advantage inherent in the embodiments described hereinbefore substantially consists in the fact that any desired number of pre-manufactured piezoceramic sheet systems, for example, of different output, self-resonance, geometry, electric capacity, or oscillation behavior, and a further desired variety of cover plates which, for example, differ with respect to their geometry, properties of material, and resonant properties are at one's disposal which can be combined with one another as desired, in particular, in a preselected and defined way, to satisfy special applications. In the transmitting state, the ultrasonic emission behavior of such modules is substantially defined by the predetermined resonant properties of the cover plates 3, 31, 32, 33, 33', thus it is feasible to operate the piezoceramic sheet(s) 1 outside of, particularly below the resonant frequency correlated to its operation direction without an interfering loss in ultrasonic amplitude which even might render the entire system ineffective, as it is the case with the prior art devices. A further essential advantage of the present invention, based on the inventional arrangement being operable below the resonant frequency of the piezoelectric excitation systems, lies in the fact that the respective constructions can be built smaller by a factor of ten to emit a same ultrasonic output as corresponding state of art devices.

When, for example, a transducer according to the state of art and in analogy to FIG. 1a is operated at a frequency of 60 kHz at a resonant frequency of the cover plate of, for example, also 60 kHz then the effective piezo-sheet length required has to be about 30 mm. In contrast thereto an inventional setup of the transducer only requires an effective piezo-sheet length of about 12 mm to obtain an equal output at an about tenfold reduced emitting surface 4.

The embodiments which lie within the scope of the invention and which are described hereinafter follow a slightly other way to match the characteristic acoustic impedance, though basically obeying the essential means of the invention.

One of these basic embodiments will be described by means of a schematical representation according to FIG. 4.

This embodiment has a base plate 6 of heavy mass consisting, for example, of ceramics and, arranged in parallel thereto, a rigid and low mass cover lamina 30 between which parallel to one another a plurality of sheets 1, made of a homogeneous piezo-electric material, are arranged at right angles to both, the basic plate 6 and the cover lamina 30 and are connected via their narrow sides 22, 21 to the latter. A respective open space "a" is established between the sheets 1 which has an order of tenfold the size of the thickness "d" of the individual sheets considered in the same direction. The piezoceramic sheets 1 employed are conceived considerably thin with respect to their thickness "d" which substantially is determined by the ultimate mechanical strength and the electrical breakdown voltage which must not be exceeded. In a typical reduction to practice the individual sheets 1 have dimensions of, for example, (0.2·3·18) mm in which more than the number of sheets represented are employed. The individual sheets 1 in particular exhibit a length-to-height ratio in an order of size of 5–10. The heights and lengths mentioned which substantially determine the respective self-resonant frequencies of the transducer have not to be considered as limiting the invention thereto. The respective proposed practical dimensions only depend on the desired properties of the transducer, such as operation frequency, size, sound amplitude which include a plurality of feasible embodiments in accordance with the invention.

In the embodiment according to FIG. 4 a thin disk of about 0.3 mm thickness made of glass, silicon, ceramics or any other suitable plastic material is employed for said cover lamina 30 selected in accordance with the requirements concerning rigidity and low mass. Preferably, this design, just as the above described, also permits the employment of materials in cell construction which, due to their extremely light mass, can be built up thicker and, hence, more rigidly. In order to eliminate any interfering transversal resonances the piezoceramic sheets 1 can be made of mutually different lengths along a direction $n_3$ being at right angles to the normals $n_2$ and $n_1$ which, as shown in FIG. 5, correspond to the chord lengths of a group of chords in an ellipse represented in dash-lines, or in a circle. As indicated in FIG. 6, the respective individual sheets 1 can be divided into portions 11, 12, of different is length in $n_3$ direction when a rectangular arrangement is desired. A transducer, according to FIG. 4, which satisfies the above dimensions has, for example, basic resonant frequencies at 50 kHz and 210 kHz, respectively. Such a transducer is adapted to emit and to receive airborne ultrasonic waves over a wide frequency spectrum outside of its self-resonance points. Since it exhibits extremely low postoscillations in this mode of operation it is particularly suited for measuring extremely short distances as well as for information transfer. To this end the entire sheets 1 are in-phase excited by an equal frequency and amplitude.

A further feasible embodiment of respective thin piezoceramic sheets 1 is schematically, but not in scale size, shown in FIG. 7. Such a representation, just as that of a basic plate 6 in FIG. 8, does not satisfy conditions as they are in practice, and only serves as a more distinct explanation. A preferably extruded sintered piezoceramic hollow body 7 is used comprising pockets 8 in honeycomb structure. The pockets 8 the number of which, in reality, is about 50, wherein the hollow body has dimensions of, for example, (20·20·5) mm, said pockets 8 are provided with a metallic contact means, not shown in detail, which permits a polarization of the ceramic bridges of, for example, 0.3 mm thickness employed as sheets. Subsequent pockets 8 are supplied with differently signed voltages. This is achieved by means of a base plate 6, shown in FIG. 8 in more detail, which is provided with a chess-board pattern of respective electrodes 9 to which said hollow body 7 is connectable via its bottom area. For sake of simplicity, the contacts of the respective electrodes 9 with one another and with the respective contact means of the pockets 8 are not shown. Said bottom area of said hollow body 7 provided with said base plate 6 again carries a cover plate 3 and 30, respectively, on its remote end face in accordance with the previous embodiments, without showing the means in more detail in FIG. 7. A transducer designed according to this embodiment in particular is mechanically stable, inexpensive and easy in manufacture and can be employed in the same manner as those described previously.

The entire previous embodiments are conceived only for piston strokes of the respective cover plates of a transducer operating both, in transmission and reception.

In the following, an embodiment is schematically shown in FIG. 9 substantially designed in analogy to FIG. 4, however, the individual sheets 1 employed are arranged under an angle $\beta$ relative to a respective cover lamina 30 and to a base plate 6, wherein $\beta<90°$. In this case the sheets 1 tale the form of so-called bending resonators which, for example, according to the state of art can be realized by two differently polarized ceramic layers. Such bending resonators produce considerably larger amplitudes. Such an arrangement is acoustically particularly "soft" and, hence, exhibits a still better coupling behavior, for example, to air, compared to the embodiments described hereinbefore, and therefore can be employed particularly as a sound receiving transducer. The oscillation direction which the cover lamina 30 follows is indicated by a double arrow in FIG. 9.

The features disclosed in the specification, in the subsequent claims, and in the drawings are substantial for the invention individually but also in any combination.

LIST OF REFERENCE NUMERALS 1,11,12—piezoelectric sheet
21,22—narrow sides of piezoelectric sheet
23—broad lateral face
3,31,32—cover plate
33,33'—cover plate as truncated pyramid or pyramid roof
30—lamina
4—sound emitting and receiving, respectively, area
5—surface lines
α—angle of sound emitted
6—base plate
7—piezoceramic hollow body
8—honeycomb pocket
9—chess-board pattern contact means
10—mount
$n_1$—normal on sheet
$n_2$—normal on plate and lamina, respectively
$n_3$—direction of normal on $n_1$ and $n_2$
β—bending resonator sheet angle
a—space of sheets
d—thickness of sheets

We claim:
1. Piezoelectric ultrasonic transducer of adaptable sound characteristic impedance comprising at least one sheet made of piezoceramic material being provided with electrodes on its large lateral faces, said sheet being operable in the $d_{31}$-mode, at least one sound emitting and sound receiving, respectively, face, in which the center of mass of the entire transducer system is arranged remote from the sound emitting and sound receiving, respectively, face (4), characterized in that at least one sheet (1) is provided which, via one of its narrow sides (21), is connected to at least one geometrically and variably adaptable rigid cover plate (30, 3, 31, 3, 33, 33') of low mass, compared to the entire transducer and sheet mass, respectively, in which said cover plate is embodied with respect to the selected geometrical dimensions and coupled to the narrow side of the sheet (1) via a narrow coupling face to yield an independent self-resonant system, in such a manner that at least in the sound emitting mode the entire surface (4) of said cover plate (3, 31, 32, 33, 33') is substantially completely covered by the surface lines (5) of an emission angle ($\alpha$) under which the piezoelectric sheet (1) irradiates said cover plate (3, 31, 32, 33, 33') and only said surface (4) has the function of a sound-emitting and receiving, respectively, area, the self-resonant frequencies of said at least one piezoceramic sheet (1) and of the sound emitting and sound receiving, respectively, cover plate being selected distinctly different from one another.

2. Piezoelectric ultrasonic transducer as claimed in claim 1, wherein the geometry of said cover plate (3, 31, 32, 33, 33') is substantially selected to follow the the emission angle ($\alpha$) of the sheet(s) at least in its external rim portions.

3. Piezoelectric ultrasonic transducer as claimed in claim 1 or 2, wherein a plurality of piezoelectric sheets (1) in mutually parallel and spaced relation are provided with a common one-piece cover plate (30; 3, 32, 33, 33') on their respective narrow sides (21).

4. Piezoelectric ultrasonic transducer as claimed in claim 1 or 2, wherein a plurality of piezoelectric sheets (1) in mutually parallel and spaced relation are provided with one respective individual cover plate (31, 32) on the respective narrow sides (21).

5. Piezoelectric ultrasonic transducer as claimed in 4, wherein a part of adjacent cover plates (31, 33') is partially connected with one another.

6. Piezoelectric ultrasonic transducer as claimed in claim 1 or 2, wherein a material of pre-selectable sound-characteristic impedance is selected for the cover plate(s) (3, 31, 32, 33 33').

7. Piezoelectric ultrasonic transducer as claimed in claim 1 or 2, wherein the normals ($n_1$) of the piezoelectric sheet(s) (1) and the normals ($n_2$) of the cover plate(s) (30; 3, 31, 32, 33, 33') are arranged at right angles to one another.

8. Piezoelectric ultrasonic transducer as claimed in claim 1, wherein said center of mass of the entire system is shifted by means of a base plate (6), rich of mass, to the range of a plurality of individual piezoelectric sheets (1) which are arranged in adjacent spaced relation and wherein said piezoelectric sheets are connected via their opposing narrow sides (22, 21) to said base plate (6) and to a one-piece cover lamina (30), respectively.

9. Piezoelectric ultrasonic transducer as claimed in claim 8, wherein the thickness (d) of said individual sheets is a predetermined minimum and wherein the mutual space (a) of the individual sheets is determined by an order of size of tenfold the thickness (d).

10. Piezoelectric ultrasonic transducer as claimed in claim 8 or 9, wherein said individual sheets (1) are embodied as piezoelectric bending resonators which include an angle ($\beta$) with said cover lamina (30) and said base plate (6), wherein $\beta<90°$.

11. Piezoelectric ultrasonic transducer as claimed in claim 8 or 9, wherein said piezoelectric sheets (1) are of different lengths along a direction ($n_3$) at right angles to the normal direction ($n_1$) of the sheets and to the normal direction ($n_2$) of the cover lamina (30), the dimensions of said lengths follow a chord length of a group of chords of an ellipse.

12. Piezoelectric ultrasonic transducer as claimed in one of the preceding claims 8 or 9, wherein said piezoelectric individual sheets are embodied at least partially as interrupted sheets (11, 12) along a direction ($n_3$) at right angles to the normal direction ($n_1$) of the sheets and to the normal direction ($n_2$) of the cover lamina (30).

13. Piezoelectric ultrasonic transducer as claimed in one of the preceding claims 1,2 or 8, wherein the piezoelectric sheets (1) are constituted of an extruded piezoceramic hollow body (7) with pockets (8) in honeycomb structure which are provided with internal electrical contacts, and wherein means are provided which alternatingly polarize subsequent pockets (7).

14. Piezoelectric ultrasonic transducer as claimed in claim 13, wherein said means for different polarization is constituted by a base plate (6) provided with a chess-board contact array (9) following said pockets (8) of honeycomb structure.

* * * * *